United States Patent
Kim et al.

(10) Patent No.: US 11,961,515 B2
(45) Date of Patent: Apr. 16, 2024

(54) CONTRASTIVE SIAMESE NETWORK FOR SEMI-SUPERVISED SPEECH RECOGNITION

(71) Applicant: Google LLC, Mountain View, CA (US)

(72) Inventors: Jaeyoung Kim, Mountain View, CA (US); Soheil Khorram, Mountain View, CA (US); Hasim Sak, Santa Clara, CA (US); Anshuman Tripathi, Mountain View, CA (US); Han Lu, Santa Clara, CA (US); Qian Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 309 days.

(21) Appl. No.: 17/644,337

(22) Filed: Dec. 14, 2021

(65) Prior Publication Data

US 2023/0096805 A1 Mar. 30, 2023

Related U.S. Application Data

(60) Provisional application No. 63/261,895, filed on Sep. 30, 2021.

(51) Int. Cl.
*G10L 15/16* (2006.01)
*G06N 3/088* (2023.01)
*G10L 15/18* (2013.01)

(52) U.S. Cl.
CPC .............. *G10L 15/16* (2013.01); *G06N 3/088* (2013.01); *G10L 15/1815* (2013.01)

(58) Field of Classification Search
None
See application file for complete search history.

(56) References Cited

U.S. PATENT DOCUMENTS 10,332,509 B2 6/2019 Catanzaro et al.
2019/0325275 A1* 10/2019 Lee .................. G06V 30/19167
(Continued)

OTHER PUBLICATIONS

Lain et al.; "Speech Emotion Recognition via Contrastive Loss under Siamese Networks"; Oct. 26, 2018; ASMMC-MMAC'18; pp. 21-26 (Year: 2018).*

(Continued)

*Primary Examiner* — Shreyans A Patel
(74) *Attorney, Agent, or Firm* — Honigman LLP; Brett A. Krueger; Grant Griffith

(57) ABSTRACT

A method includes receiving a plurality of unlabeled audio samples corresponding to spoken utterances not paired with corresponding transcriptions. At a target branch of a contrastive Siamese network, the method also includes generating a sequence of encoder outputs for the plurality of unlabeled audio samples and modifying time characteristics of the encoder outputs to generate a sequence of target branch outputs. At an augmentation branch of a contrastive Siamese network, the method also includes performing augmentation on the unlabeled audio samples, generating a sequence of augmented encoder outputs for the augmented unlabeled audio samples, and generating predictions of the sequence of target branch outputs generated at the target branch. The method also includes determining an unsupervised loss term based on target branch outputs and predictions of the sequence of target branch outputs. The method also includes updating parameters of the audio encoder based on the unsupervised loss term.

24 Claims, 6 Drawing Sheets

(56) References Cited

U.S. PATENT DOCUMENTS

| | | | |
|---|---|---|---|
| 2020/0027444 A1 | 1/2020 | Prabhavalkar et al. | |
| 2021/0056417 A1* | 2/2021 | Zhang | G06F 18/211 |
| 2021/0089964 A1* | 3/2021 | Zhang | G06V 10/771 |
| 2021/0133623 A1* | 5/2021 | Amrani | G06F 18/23 |
| 2023/0096805 A1* | 3/2023 | Kim | G06N 3/0895 |
| | | | 704/232 |

OTHER PUBLICATIONS

International Search Report and Written Opinion for the related application No. PCT/US2021/063417, dated May 31, 2022, 56 pages.

Chen Xinlei et al: "Exploring Simple Siamese Representation Learning", 2021 IEEE/CVF Conference on Computer Vision and Pattern Recognition (CVPR), IEEE, Jun. 20, 2021 (Jun. 20, 2021), pp. 15745-15753, XP034006641, DOI: 10.1109/CVPR46437.2021.01549 [retrieved on Oct. 15, 2021].

Herman Kamper et al: "Improved acoustic word embeddings for zero-resource languages using multilingual transfer", arxiv.org, Cornell University Library, 201 Olin Library Cornell University Ithaca, NY 14853, Jun. 2, 2020 (Jun. 2, 2020), XP081691015.

Kamper Herman et al: "Deep convolutional acoustic word embeddings using word-pair side information", 2016 IEEE International Conference on Acoustics, Speech and Signal Processing (ICASSP), IEEE, Mar. 20, 2016 (Mar. 20, 2016), pp. 4950-4954, XP032901545, DOI: 10.1109/ICASSP.2016.7472619 [retrieved on May 18, 2016].

* cited by examiner

CONTRASTIVE SIAMESE NETWORK FOR SEMI-SUPERVISED SPEECH RECOGNITION

CROSS REFERENCE TO RELATED APPLICATIONS

This U.S. Patent Application claims priority under 35 U.S.C. § 119(e) to U.S. Provisional Application 63/261,895, filed on Sep. 30, 2021. The disclosure of this prior application is considered part of the disclosure of this application and is hereby incorporated by reference in its entirety.

TECHNICAL FIELD

This disclosure relates to contrastive Siamese network for semi-supervised speech recognition.

BACKGROUND

Automatic speech recognition (ASR) systems attempt to provide accurate transcriptions of what a person has said by taking an audio input and transcribing the audio input into text. In many instances, supervised learning is used to train ASR systems with large quantities of labeled training data that includes audio data and a corresponding transcription. Obtaining the large quantity of labeled training data required to train the ASR systems, however, is often difficult because of the amount of time required, costs, and/or privacy concerns associated with collecting the large labeled training datasets. Training ASR systems using unlabeled training data that includes only audio data can alleviate some of the difficulties with collecting large quantities of labeled training data.

SUMMARY

One aspect of the disclosure provides a contrastive Siamese network for training a speech recognition model. The contrastive Siamese network includes an unsupervised subnetwork trained on a plurality of unlabeled audio samples that correspond to spoken utterances not paired with any corresponding transcriptions. The unsupervised subnetwork includes a target branch configured to receive a sequence of acoustic frames extracted from the unlabeled audio samples as input to an audio encoder of the speech recognition model and generate, at each of a plurality of time steps, a target branch output for a corresponding acoustic frame in the sequence of acoustic frames input to the audio encoder at the corresponding time step. The unsupervised subnetwork also includes a an augmented branch configured to: perform augmentation on the sequence of acoustic frames extracted from the unlabeled audio samples to generate a sequence of augmented acoustic frames; generate, at each of the plurality of time steps, a higher order feature representation for a corresponding augmented acoustic frame in the sequence of augmented acoustic frames as output from the audio encoder; and generate, at each of the plurality of time steps, using the higher order feature representation output from the audio encoder at the corresponding time step, a prediction of the target branch output generated by the target branch at the corresponding time step. The unsupervised subnetwork is configured to determine, at each of the plurality of times steps, an unsupervised loss term based on the target branch output generated by the target branch at the corresponding time step and the prediction of the target branch output generated by the augmented branch at the corresponding time step. Here, the unsupervised subnetwork is also configured to update parameters of the audio encoder based on the unsupervised loss term determined at each of the plurality of time steps.

Implementations of the disclosure may include one or more of the following optional features. In some implementations, the unsupervised loss term includes a contrastive loss term. The augmentation performed on the sequence of acoustic frames may include time modification and masking. In some examples, the target branch is further configured to generate, at each of the plurality of time steps, a higher order feature representation for the corresponding acoustic frame in the sequence of acoustic frames input to the audio encoder at the corresponding time step as output from the audio encoder. Here, the target branch is configured to generate the target branch output for the corresponding acoustic frame by modifying time characteristics of the higher order feature representation. In these examples, modifying the time characteristics of the higher order feature representation may include modifying, at each of the plurality of time steps, the time characteristics of the higher order feature representation generated as output from the audio encoder for the corresponding acoustic frame to match time characteristics associated with the higher order feature representation generated as output from the audio encoder for the corresponding augmented acoustic frame at the corresponding time step.

In some implementations, the augmented branch includes a prediction network of transformer layers configured to, at each of the plurality of time steps, receive the higher order feature representation output from the audio encoder at the corresponding time step as input and generate the prediction of the target branch output generated by the target branch at the corresponding time step as output. In some examples, the contrastive Siamese network includes a supervised subnetwork trained on a plurality of labeled audio samples that correspond to spoken utterances paired with corresponding transcriptions. In these examples, at each of a plurality of output steps for each labeled audio sample, the supervised subnetwork is configured to generate a corresponding speech recognition result for the labeled audio sample using the speech recognition model and determine a supervised loss term based on the corresponding speech recognition result for the labeled audio sample and the corresponding transcription of the labeled audio sample. Here, the supervised subnetwork updates parameters of the speech recognition model based on the supervised loss term determined at each of the plurality of output steps for each labeled audio sample in the plurality of labeled audio samples.

The corresponding speech recognition result generated for the labeled audio sample using the speech recognition model may include a probability distribution over possible speech recognition hypotheses for the labeled audio sample at the corresponding output step. In some examples, the supervised subnetwork is configured to update the parameters of the speech recognition model based on the supervised loss term independently of the unsupervised network updating the parameters of the audio encoder of the speech recognition model. In other examples, the supervised subnetwork is further configured to apply data augmentation to at least one of the labeled audio samples in the plurality of labeled audio samples input to the speech recognition model. In these other examples, the applied data augmentation includes at least one of adding noise, adding reverberation, or manipulating timing.

In some implementations, the trained speech recognition model includes a Transformer-Transducer (T-T) model that includes the audio encoder configured to receive a sequence of acoustic frames extracted from audio data characterizing a spoken utterance as input and generate a higher order feature representation for a corresponding acoustic frame in the sequence of acoustic frames at each of a plurality of time steps. In these implementations, the T-T model also includes: a label encoder configured to receive a sequence of non-blank symbols output by a final softmax layer as input and generate a dense representation at each of the plurality of time steps; and a joint network configured to receive, as input, the higher order feature representation generated by the audio encoder at each of the plurality of time steps and the dense representation generated by the label encoder at each of the plurality of time steps and generate, at each of the plurality of time steps, a probability distribution over possible speech recognition hypothesis at the corresponding time step. Here, the audio encoder includes a neural network having a stack of strided convolutional layers and transformer layers.

Another aspect of the disclosure provides a computer-implemented method that when executed on data processing hardware causes the data processing hardware to perform operations for training a speech recognition model using a contrastive Siamese network. The operations include receiving a plurality of unlabeled audio samples corresponding to spoken utterances not paired with corresponding transcriptions. At a target branch of a the Contrastive Siamese network, the operations include generating a sequence of encoder outputs for the plurality of unlabeled audio samples using an audio encoder of the speech recognition model and modifying time characteristics of the encoder outputs to generate a sequence of target branch outputs. At an augmentation branch of the contrastive Siamese network, the operations include performing augmentation on the unlabeled audio samples, generating a sequence of augmented encoder outputs for the augmented unlabeled audio samples using the audio encoder of the speech recognition model, and generating predictions of the sequence of target branch outputs generated at the target branch using a prediction network configured to receive the sequence of augmented encoder outputs. The operations also include determining an unsupervised loss term based on the target branch outputs generated at the target branch and the predictions of the target sequence of branch outputs generated at the augmentation branch. The operations also include updating parameters of the audio encoder based on the unsupervised loss.

Implementations of the disclosure may include one or more of the following optional features. In some implementations, the unsupervised loss term includes a contrastive loss term. Performing augmentation on the unlabeled audio samples may includes performing time modification and masking on the unlabeled audio samples. In some examples, the operations further include generating a higher order feature representation for the plurality of unlabeled audio samples as output from the audio encoder. In these examples, modifying the time characteristics of the encoder outputs to generate the sequence of target branch outputs includes modifying the time characteristics of the encoder outputs generated as output from the audio encoder to match time characteristics associated with the sequence of augmented encoder outputs from the audio encoder. In some implementations, the operations further include receiving the sequence of augmented encoder outputs as input to a prediction network of transformer layers of the augmented branch and generate, as output from the prediction network of transformer layers of the augmented branch, the predictions of the sequence of target branch outputs generated at the target branch.

In some examples, the operations further include receiving a plurality of labeled audio samples corresponding to spoken utterances paired with corresponding transcriptions, generating speech recognition results for the labeled audio samples using the speech recognition model, determining a supervised loss term based on the speech results for the labeled audio samples and the corresponding transcriptions of the labeled audio samples, and updating parameters of the speech recognition model based on the supervised loss term. In these examples, the operations may further include updating parameters of the speech recognition model based on the supervised loss term independently of updating parameters of the audio encoder based on the unsupervised loss term. Optionally, the operation further include applying data augmentation to at least one of the labeled audio samples. Here, applying data augmentations may include at least one of adding noise, adding reverberation, or manipulating timing.

In some implementations, the speech recognition model includes a Transformer-Transducer (T-T) model and the operations further include: receiving a plurality of unlabeled audio samples corresponding to spoken utterances not paired with corresponding transcriptions as input to the audio encoder of the T-T model; generating, by the audio encoder, a sequence of acoustic frames extracted from audio data characterizing a spoken utterance at each of a plurality of time steps; receiving a sequence of non-blank symbols output by a final softmax layer as input to a label encoder of the T-T model; and generating, by the label encoder, a dense representation at each of the plurality of time steps. In these implementations, the operations also include receiving, as input to a joint network of the T-T model, the higher order feature representation generated by the audio encoder at each of the plurality of time steps and the dense representation generated by the label encoder at each of the plurality of time steps and generating, by the joint network, at each of the plurality of time steps, a probability distribution over possible speech recognition hypothesis at the corresponding time step. Here, the audio encoder includes a neural network having a stack of strided convolutional layers and transformer layers.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Automatic speech recognition (ASR) systems are often trained using a supervised training technique that leverages labeled training data. The labeled training data includes speech audio data and corresponding transcriptions of the speech. Collecting large quantities of labeled training data is often difficult because of the associated costs, time required to collect the training data, and privacy concerns of users. In some instances, ASR systems train using unlabeled training data that includes only the speech audio data without any corresponding transcriptions. In these instances, the ASR may utilize only the unlabeled training data to train speech recognition systems (i.e., self-supervised training) or the unlabeled training data may be used in addition to the labeled training data to train the speech recognition systems (i.e., semi-supervised training).

Implementations herein are directed towards a contrastive Siamese network that uses a semi-supervised training technique for training a speech recognition model. The Siamese network includes a supervised subnetwork that trains the speech recognition model with labeled audio samples that include utterances and corresponding transcriptions. That is, the supervised subnetwork receives acoustic frames extracted from the labeled audio samples and predicts speech recognition results. Thereafter, the supervised subnetwork determines a loss by comparing the predicted speech recognition result and the corresponding transcription and updates the speech recognition model based on the loss.

The Siamese network also includes an unsupervised subnetwork that trains the speech recognition with unlabeled audio samples. The unsupervised subnetwork may train the speech recognition model additionally or alternatively to the supervised subnetwork. The unsupervised subnetwork includes a target branch that receives acoustic frames from the unlabeled audio samples and generates a target branch output for each acoustic frame. The unsupervised subnetwork also includes an augmented branch that performs augmentation on the acoustic frames from the unlabeled audio samples and generates a higher order feature representation (i.e., an "encoder output") using the augmented acoustic frames. Accordingly, the augmented branch uses the higher order feature representation to predict the target branch output generated by the target branch. Using the target branch output from the target branch and the prediction of the target branch output by the augmented branch, the unsupervised subnetwork determines an unsupervised loss term and updates parameters of an audio encoder of the speech recognition model based on the unsupervised loss term.

Figure 1:
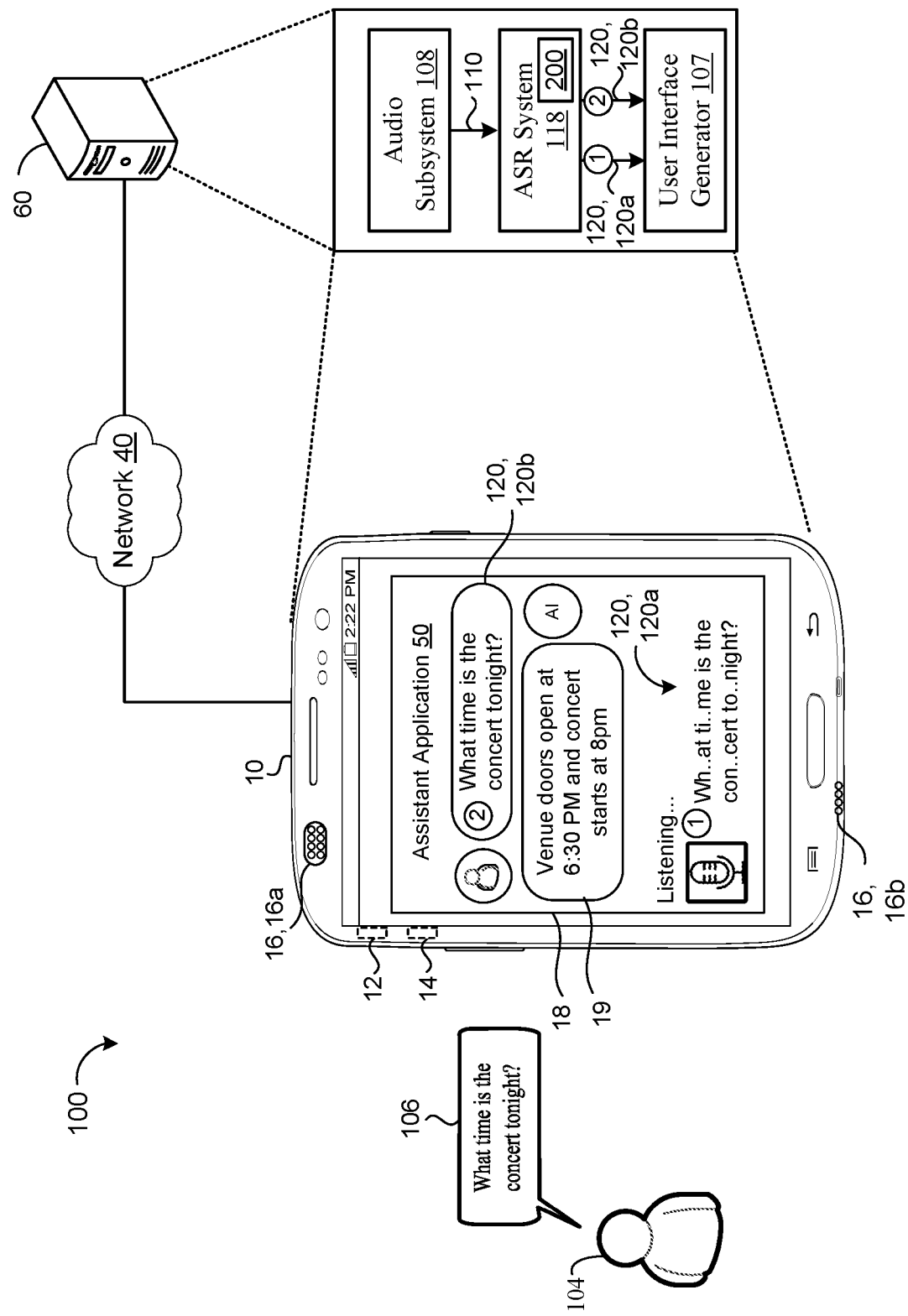
FIG. 1 is a schematic view of a speech environment executing an example speech recognition model.

FIG. 1 is an example of a speech environment 100. In the speech environment 100, a user's 104 manner of interacting with a computing device, such as a user device 10, may be through voice input. The user device 10 is configured to capture sounds (e.g., streaming audio data) from one or more users 104 within the speech environment 100. Here, the streaming audio data may refer to a spoken utterance 106 by the user 104 that functions as an audible query, a command for the user device 10, or an audible communication captured by the user device 10. Speech-enabled systems of the user device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the user device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 118 implementing a speech recognition model 200 resides on the user device 10 of the user 104 and/or on a remote computing device 60 (e.g., one or more remote servers of a distributed system executing in a cloud-computing environment) in communication with the user device 10 via a network 40. The user device 10 and/or the remote computing device (i.e., remote server) 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the speech recognition model 200 receives, as input, the audio data 110 corresponding to the utterance 106, and generates/predicts, as output, a corresponding transcription 120 (e.g., speech recognition result/hypothesis) of the utterance 106. As described in greater detail below, the speech recognition model 200 may include a Transformer-Transducer (T-T) model 200 trained with variable look ahead audio context to allow the T-T model 200 to set, during inference, different durations of look ahead audio context when performing speech recognition depending on how sensitive a query specified by the utterance 106 is to latency and/or how much tolerance the user 106 has for latency. For instance, a digital assistant application 50 executing on the user device 10 may require the speech recognition to be streaming such that words, word pieces, and/or individual characters appear on the screen as soon as they are spoken. Additionally, it is also likely that the user 104 of the user device 10 has a low tolerance for latency when issuing queries for the digital assistant application 50 to perform. In such scenarios when minimizing speech recognition latency is preferred, the speech recognition model 200 may apply zero or minimal look ahead audio context (also referred to as "right context") to provide streaming transcription capabilities in real-time as the user 104 is speaking the utterance 106. On the other hand, when the user has a higher tolerance for speech recognition latency and/or the utterance 106 to be recognized is associated with long-form speech, the same speech recognition model 200 may apply a duration of look ahead audio context sufficient to provide an accurate transcription 120, but incur increased latency based on the duration of look ahead audio context. Accordingly, the ASR system 118 may implement only a single speech recognition model 200 for a multitude of different speech recognition tasks to provide both streaming and non-streaming transcription capabilities without having to leverage separate ASR models on a task-by-task basis.

In some implementations, the speech recognition model 200 performs both streaming speech recognition and non-streaming speech recognition on the audio data 110 in parallel. For instance, in the example shown, the speech recognition model 200 performs, in parallel, streaming speech recognition on the audio data 110 to produce partial speech recognition results 120, 120a, and non-streaming speech recognition on the same audio data 110 to produce a final speech recognition result 120, 120b. Notably, the speech recognition model 200 may use a first look ahead audio context that may be set to zero (or about 240 milliseconds) to produce the partial speech recognition results 120a and use a second look ahead audio context of a longer duration than the first look ahead audio context to produce the final speech recognition result 120b. Thus, the final speech recognition result 120b for the input utterance 106 may be delayed from the partial speech recognition results 120a for the input utterance by a duration based on a difference between the second look ahead audio context and the first look ahead audio context.

The user device 10 and/or the remote computing device 60 also executes a user interface generator 107 configured to present a representation of the transcription 120 of the utterance 106 to the user 104 of the user device 10. As described in greater detail below, the user interface generator 107 may display the partial speech recognition results 120a in a streaming fashion during time 1 and subsequently display the final speech recognition result 120b during time 2. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 118.

Continuing with the example, the speech recognition model 200, while receiving the acoustic frames (i.e., audio data) 110 corresponding to the utterance 106 as the user 104 speaks, encodes the acoustic frames 110 using a first look ahead audio context and then decodes the encoded acoustic frames 110 using the first look ahead audio context into the partial speech recognition results 120a. During time 1, the user interface generator 107 presents, via the digital assistant interface 18, a representation of the partial speech recognition results 120a of the utterance 106 to the user 104 of the user device 10 in a streaming fashion such that words, word pieces, and/or individual characters appear on the screen as soon as they are spoken. In some examples, the first look ahead audio context is equal to zero.

In parallel, and after all of the acoustic frames 110 corresponding to the utterance 106 are received, the speech recognition model 200 encodes all of the acoustic frames 110 corresponding to the utterance 106 using a second look ahead audio context and then decodes the acoustic frames 110 using the second look ahead audio context into a final speech recognition result 120b. The duration of the second look ahead audio context may be 1.2 seconds, 2.4 seconds, or any other duration. In some examples, an indication such as an endpoint indicating that the user 104 has finished speaking the utterance 106 triggers the speech recognition model 200 to encode all the acoustic frames 110 using the second look ahead audio context. During time 2, the user interface generator 107 presents, via the digital assistant interface 18, a representation of the final speech recognition result 120b of the utterance 106 to the user 104 of the user device 10. In some implementations, the user interface generator 107 replaces the representation of the partial speech recognition results 120a with the representation of the final speech recognition result 120b. For instance, as the final speech recognition result 120b is presumed to be more accurate than the partial speech recognition results 120a produced without leveraging look ahead audio context, the final speech recognition result 120b ultimately displayed as the transcription 120 may fix any terms that may have been misrecognized in the partial speech recognition results 120a. In this example, the streaming partial speech recognition results 120a output by the speech recognition model 200 and displayed on the screen of the user device 10 at time 1 are associated with low latency and provide responsiveness to the user 104 that his/her query is being processed, while the final speech recognition result 120b output by the speech recognition model 200 and displayed on the screen at time 2 leverages look ahead audio context to improve the speech recognition quality in terms of accuracy, but at increased latency. However, since the partial speech recognition results 120a are displayed as the user speaks the utterance 106, the higher latency associated with producing, and ultimately displaying the final recognition result is not noticeable to the user 104.

In the example shown in FIG. 1, the digital assistant application 50 may respond to the question posed by the user 104 using natural language processing. Natural language processing generally refers to a process of interpreting written language (e.g., the partial speech recognition results 120a and/or the final speech recognition result 120b) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on a remote server 60 in communication with the data processing hardware 12 of the user device 10.

Figure 2:
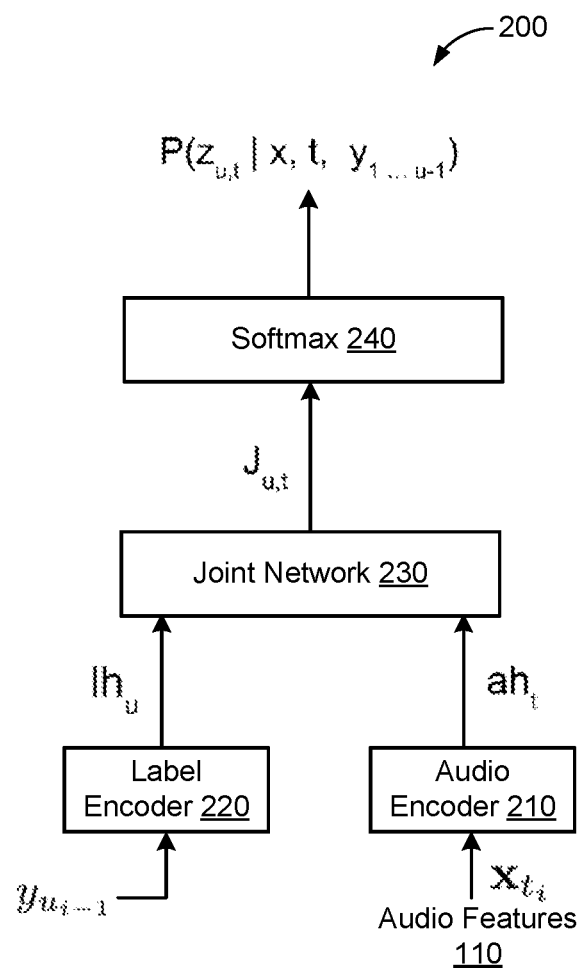
FIG. 2 is a schematic view of the example speech recognition model of FIG. 1.

With reference to FIG. 2, the speech recognition model 200 may provide an end-to-end (E2E) speech recognition by integrating acoustic, pronunciation, and language models into a single neural network, and does not require a lexicon or a separate text normalization component. Various structures and optimization mechanisms can provide increased accuracy and reduced model training time. In some implementations, the speech recognition model 200 includes a Transformer-Transducer (T-T) model architecture, which adheres to latency constraints associated with interactive applications. The T-T model 200 may include the T-T model 200 described in U.S. patent application Ser. No. 17/210,465, filed on Mar. 23, 2021, the contents of which are incorporated herein by reference in their entirety. The T-T model 200 provides a small computational footprint and utilizes less memory requirements than conventional ASR architectures, making the T-T model architecture suitable for performing speech recognition entirely on the user device 10 (e.g., no communication with a remote server 60 is required). The T-T model 200 includes an audio encoder 210, a label encoder 220, and a joint network 230. The audio encoder 210, which is roughly analogous to an acoustic model (AM) in a traditional ASR system, includes a neural network having a stack of strided convolutional layers 212 (FIG. 3) and transformer layers 214 (FIG. 3). For instance, the audio encoder 210 reads a sequence of d-dimensional feature vectors (e.g., acoustic frames 110 (FIG. 1)) $x=(x_1, x_2, \ldots, x_T)$, where $x_t \in \mathbb{R}^d$, and produces at each time step a higher-order feature representation (also referred to as an "encoder output"). This higher-order feature representation is denoted as $ah_1, \ldots, ah_T$. Each transformer layer 214 of the audio encoder 210 may include a normalization layer, a masked multi-head attention layer with relative position encoding, residual connections, a stacking/unstacking layer, and a feedforward layer. Similarly, the label encoder 220 may also include a neural network of transformer layers or a look-up table embedding model, which, like a language model (LM), processes the sequence of non-blank symbols output by a final Softmax layer 240 so far, $y_0, \ldots, y_{ui-1}$, into a dense representation $Ih_u$ that encodes predicted label history. In implementations when the label encoder 220 includes the neural network of transformer layers, each transformer layer may include a normalization layer, a masked multi-head attention layer with relative position encoding, a residual connection, a feed forward layer, and a dropout layer. In these implementations, the label encoder 220 may include two transformer layers. In implementations when the label encoder 220 includes the look-up table embedding model with a bi-gram label context, the embedding model is configured to learn a weight vector of the d-dimension for each possible bigram label context, where d is the dimension of the outputs of the audio and label encoders 210, 220. In some examples, the total number of parameters in the embedding model is $N^2 \times d$ where N is the vocabulary size for the labels. Here, the learned weight vector is then used as the embedding of the bigram label context in the T-T model 200 to produce fast label encoder 220 runtimes.

Finally, with the T-T model architecture, the representations produced by the audio and label encoders 210, 220 are combined by the joint network 230 using a dense layer $J_{u,t}$. The joint network 230 then predicts $P(z_{u,t}|x, t, y_1, \ldots, y_{u-1})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels (also referred to as "speech units") each representing a grapheme (e.g., symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector (e.g., a one-hot vector) and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $z_{u,t}$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the T-T model 200 at the corresponding output step. In this manner, the T-T model 200 does not make a conditional independence assumption, rather the prediction of each symbol is conditioned not only on the acoustics but also on the sequence of labels output so far. While the speech recognition model 200 is described as having the T-T model architecture, the speech recognition model 200 may include other types of transducer-based architectures, such as a Conformer-Transducer (C-T) model architecture or a Recurrent Neural Network-Transducer (RNN-T) model architecture.

Figure 3A:
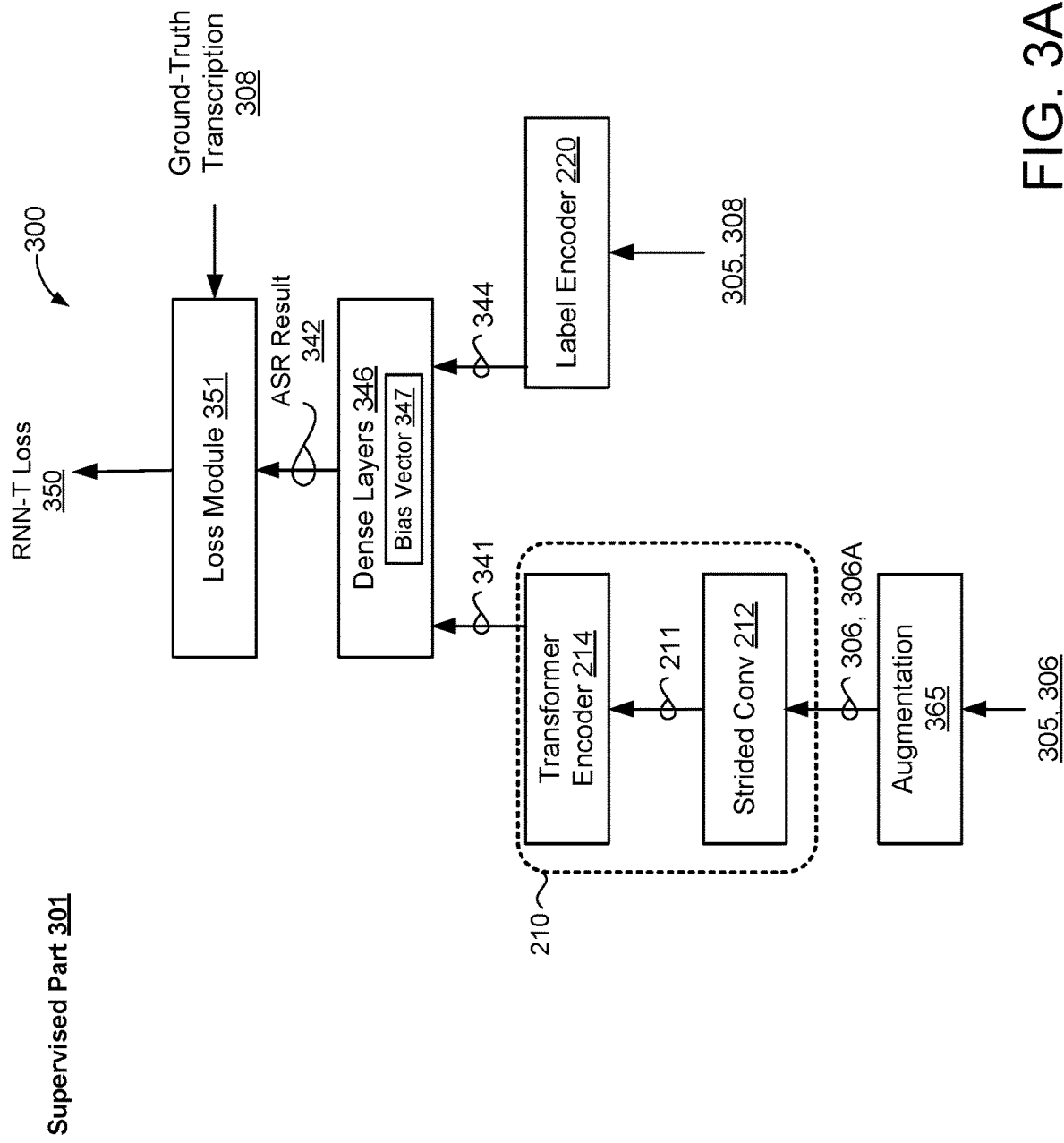
FIG. 3A is a schematic view of a supervised part of a contrastive Siamese network executing a semi-supervised training process for a speech recognition model.
Figure 3B:
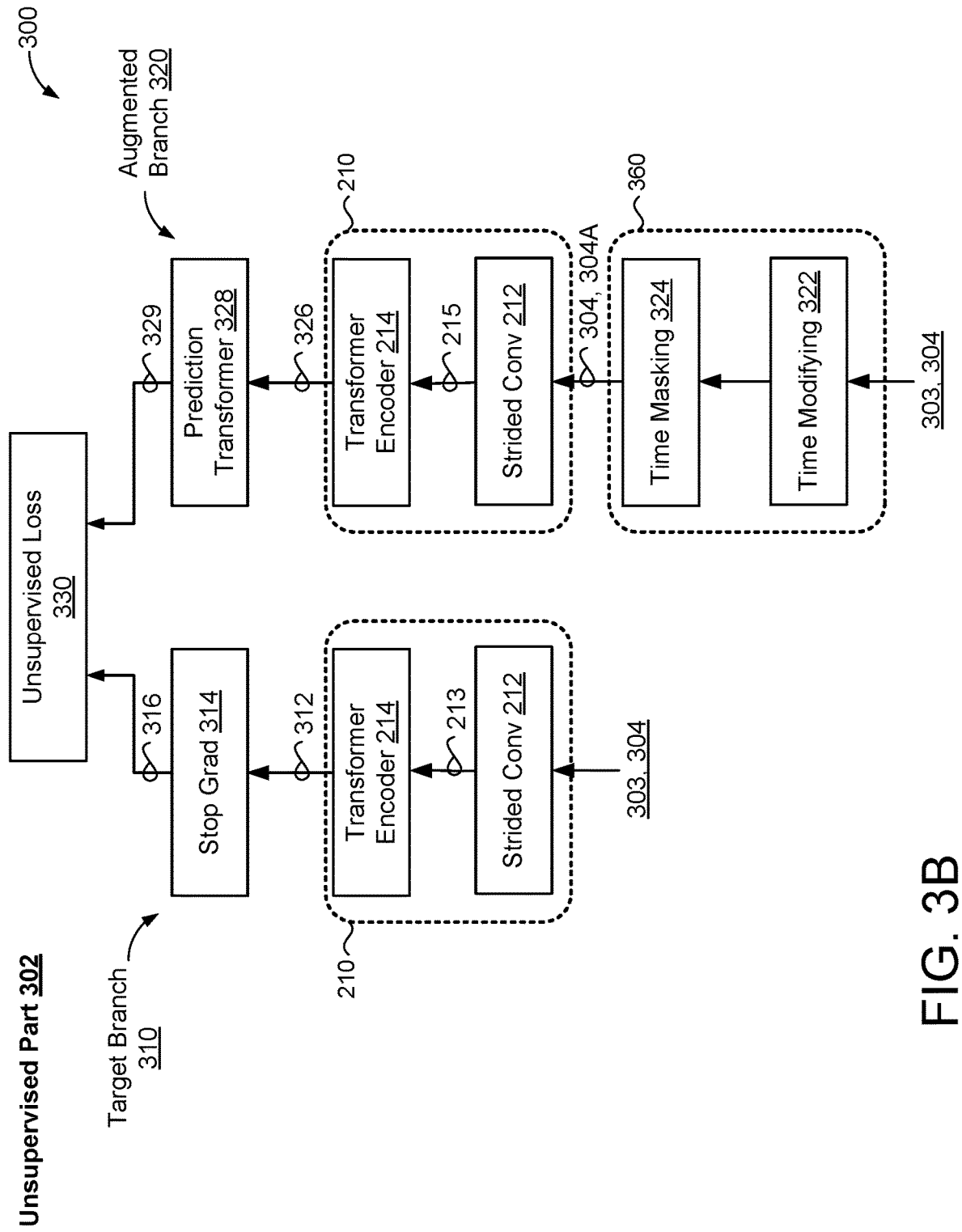
FIG. 3B is a schematic view of an unsupervised part of the contrastive Siamese network executing the semi-supervised training process for the speech recognition model.

FIGS. 3A and 3B illustrate schematic views of a contrastive Siamese network 300 executing a semi-supervised training process for training the speech recognition model 200 (FIG. 2). The contrastive Siamese network includes a supervised subnetwork training process 301 (FIG. 3A) and an unsupervised subnetwork training process 302 (FIG. 3B). The supervised subnetwork training process (i.e., supervised subnetwork) 301 trains the speech recognition model 200 using a plurality of labeled audio samples 305 that includes a sequence of acoustic frames 306 extracted from spoken utterances 106 paired with corresponding transcriptions (i.e., labels) 308. The unsupervised subnetwork training process (i.e., unsupervised subnetwork) 302 trains the speech recognition model 200 using a plurality of unlabeled audio samples 303 that includes a sequence of acoustic frames 304 extracted from spoken utterances 106 without any paired transcriptions.

In some examples, the acoustic frames 306 used by the supervised subnetwork (i.e., supervised part) 301 are the same as the acoustic frames 304 used by the unsupervised subnetwork (i.e., unsupervised part) 302. That is, the supervised part 301 and the unsupervised part 302 may train the speech recognition model 200 using the same acoustic frames 304, 306 concurrently. In other examples, the acoustic frames 306 used to train the supervised part 301 are different from the acoustic frames 304 used to train the unsupervised part 302. This scenario is especially beneficial since the unlabeled audio samples 303 without any corresponding transcriptions are easy to obtain and can be leveraged to train the speech recognition model 200. As such, the speech recognition model 200 may be trained on any combination of labeled audio samples 305 and/or unlabeled audio samples 303. In some examples, the sequence of acoustic frames 304, 306 extracted from the unlabeled audio samples 303 and labeled audio samples 305 include log Mel-filterbank energies. A greater number acoustic frames 304 may be used to train the unsupervised part 302 than the number of acoustic frames 306 used to train the supervised part 301. Optionally, a greater number of acoustic frames 306 may be used to train the supervised part 301 than the number acoustic frames 304 used to train the unsupervised part 302. In some examples, the number of acoustic frames 306 used to train the supervised part 301 and the number of acoustic frames 304 used to train the unsupervised part 302 are the same.

The supervised part 301 and the unsupervised part 302 share the same audio encoder 210 that includes a stack of strided convolutional layers 212 and transformer layers 214 that are trained together using a same Adam optimizer and a same learning rate. When the speech recognition model 200 corresponds to a Conformer-Transducer model architecture, the audio encoder 210 may include conformer layers in lieu of transformer layers.

Referring now to FIG. 3A, the supervised part 301 of the contrastive Siamese network 300 trains the speech recognition model 200 using the plurality of labeled audio samples 305. The plurality of labeled audio samples 305 include the sequence of acoustic frames 306 extracted from the labeled audio samples 305 and the corresponding labels/transcriptions 308. The supervised part 301 shares the same audio encoder 210 from the speech recognition model 200 as the unsupervised part 302 in addition to the label encoder 220 and joint network 230 (not shown in FIG. 3A).

In some implementations, the supervised part 301 includes a data augmentation module 365 that applies data augmentation to at least one acoustic frame 306 extracted from the labeled audio samples 305 to generate a sequence of augmented acoustic frames 306, 306A. The data augmentation module 365 of the supervised part 301 may be the same (or different) as a data augmentation module 360 (FIG. 3B) of the unsupervised part 302. In some examples, the data augmentation module 365 of the supervised part 301 applies different data augmentation techniques than the data augmentation module 360 of the unsupervised part. Applying data augmentation to the acoustic frames 306 furthers the acoustic diversity of the audio frames used to train the speech recognition model 200. In some examples, the data augmentation module 360 includes a time modifying component that manipulates timing of the sequence of acoustic frames 306. The data augmentation module 360 may additionally or alternatively include a time masking component that masks portions of the acoustic frames 306. Other techniques applied by the data augmentation module 360 may include adding/injecting noise and/or adding reverberation of the labeled audio samples 305. One data augmentation technique includes using multistyle training (MTR) to inject a variety of environmental noises to the labeled audio samples 305. Another data augmentation technique that the data augmentation module 360 may apply in addition to, or in lieu of, MTR, includes using spectrum augmentation (SpecAugment) to make the acoustics of the labeled audio samples 305 closer to the adverse acoustics of other labeled audio samples 305. In combination, MTR and SpecAugment may inject noises into the labeled audio samples 305, tile random external noise sources along time and inserted before and overlapped onto the representation, and filtering the noise-injective labeled audio samples prior to training the speech recognition model 200.

The audio encoder 210 of the supervised part 301 receives the augmented sequence of acoustic frames 306A and generates an encoder output 341 for each augmented acoustic frame 306A. The encoder output 342 may include a probability distribution of possible speech recognition hypotheses. In particular, the strided convolutional layers 212 receive an augmented acoustic frame 306A and generate a corresponding output 211. The transformer layers 214 receive the output 211 from the strided convolutional layers 212 and generate the encoder output 341.

The label encoder 220 is a streaming transformer that does not attend to future labels 308. Accordingly, the label encoder 220 receives a label 308 corresponding to the augmented acoustic frame 306A received by the audio encoder 210 and generates a linguistic embedding 344 (i.e., dense representation $lh_u$ (FIG. 2)). The supervised part 301 includes dense layers 346 that process the linguistic embedding 344 from the label encoder 220 and the encoder output 341 (i.e., acoustic embedding) from the audio encoder 210 to produce a corresponding speech recognition result 342 for each acoustic frame 306 (e.g., augmented acoustic frame 306A) input to the speech recognition model 200 at the corresponding time step. The dense layers 346 include a trainable bias vector 347 that performs a linear operation on the encoder output 341 and the linguistic embedding 344 to generate the speech recognition result 342. A loss module 351 of the supervised part 301 determines a supervised loss term 350 based on the outputs from the dense layers 346 for the resulting speech recognition result 342. That is, the loss module 351 compares the speech recognition result 342 to the label (e.g., ground truth transcription) 308 to generate the supervised loss 350. The supervised loss term (e.g., RNN-T loss) 350 may be represented by:

$$r_t = \text{linear}(\tan h(\text{linear}(a_t) + \text{linear}(l_e))) \quad (2)$$

In Equation 2, $r_t$ represents a logit vector that specifies the probability of graphemes including the blank symbol, $a_t$ represents the encoder output 341 from the audio encoder 210, le represents linguistic embeddings 344 from the label encoder 220, and linear represents the conventional dense layers 346 with the trainable bias vector 347.

The supervised part 301 updates parameters of the speech recognition model 200 based on the supervised loss term 350 determined at each of the plurality of output steps for each labeled audio sample 305 in the plurality of labeled audio samples 305. In some implementations, the supervised part 301 is configured to update the parameters of the speech recognition model 200 based on the supervised loss term 350 independently of the unsupervised part 302 updating the parameters of the audio encoder 210 of the speech recognition model 200.

Referring now to FIG. 3B, the unsupervised part 302 trains the speech recognition model 200 using a plurality of unlabeled audio samples 303 that includes a sequence of acoustic frames 304 extracted from spoken utterances 106 that are not paired with any transcriptions. As shown in the examples, the unsupervised part 302 of the contrastive Siamese network 300 includes a target branch 310 and an augmented branch 320 that share the same audio encoder 210 of the speech recognition model 200 (FIG. 2) that includes the stack of strided convolutional layers 212 and the transformer layer 214. The unsupervised part 302 is configured to extract linguistic information by matching output sequences (i.e., sequences of encoder outputs 312, 326) of the transformer audio encoders 210 from the target branch 310 and the augmented branch 320.

The target branch 310 is configured to generate a target branch output 316 based on the sequence of acoustic frames 304 extracted from the unlabeled audio samples 303. The audio encoder 210 of the target branch 310 receives the sequence of acoustic frames 304 and generates, at each time step, a higher order feature representation 312. In particular, the strided convolutional layers 212 receive an acoustic frame 304 from the sequence of acoustic frames 304 and generate an output 215. The transformer layers 214 receive the output 215 from the strided convolutional layers 212 and generate the higher order feature representation (i.e., encoder output) 312 for the corresponding acoustic frame 304.

The transformer audio encoders 210 included in the target branch 310 and augmented branch 320 benefit from positional embeddings to capture temporal dynamics of the sequence of acoustic frames 304. Accordingly, it is necessary to modify time characteristics of the higher order feature representation 312 output by the audio encoder 210 at the target branch 310 to avoid the audio encoder 210 at the unsupervised part 302 from generating encoder outputs 312, 326 with a low contrastive loss just based on the positional embeddings. Put another way, without modifying time characteristics of the higher order feature representation 312 output by the audio encoder 210 at the target branch 310, all outputs of the unsupervised part 302 of the contrastive siamese network 300 will "collapse" to a constant value. Accordingly, the target branch 310 applies a stop gradient operation 314 that modifies time characteristics of the higher order feature representation 312 to generate the target branch output 316 for the corresponding acoustic frame 304. In some implementations, the stop gradient operation 314 modifies the time characteristics of the higher order feature representation 312 output by the audio encoder 210 by modifying the time characteristics of the higher order feature representation 312 to match time characteristics associated with a corresponding augmented acoustic frame 304, 304A input to the audio encoder 210 at the augmented branch 320 to generate a corresponding higher order feature representation 326. As will become apparent, the higher order feature representation 326 generated by the audio encoder 210 at the augmented branch 320 corresponds to an augmented higher order feature representation 326 (or augmented encoder output) having modified time characteristics based on the augmented acoustic frame 304A input to the audio encoder 210.

The augmentation branch 320 of the unsupervised part 302 includes a data augmentation module 360 that applies data augmentation to each acoustic frame 304 extracted from an unlabeled audio sample 303. The augmentation module 360 receives the sequence of acoustic frames 304 and generate a sequence of augmented acoustic frames 304A. Applying data augmentation to the acoustic frames 304 furthers the acoustic diversity of the audio frames used to train the speech recognition model 200. In some examples, the data augmentation module 360 includes a time modifying component 322 that manipulates timing of the sequence of acoustic frames 304. The data augmentation module 360 may additionally or alternatively include a time masking component 324 that masks portions of the acoustic frames 304. Other techniques applied by the data augmentation module 360 may include adding/injecting noise and/or adding reverberation of the labeled audio samples. One data augmentation technique includes using multistyle training (MTR) to inject a variety of environmental noises to the unlabeled audio samples 303. Another data augmentation technique that the data augmentation module 360 may apply in addition to, or in lieu of, MTR, includes using spectrum augmentation (SpecAugment) to make the acoustics of the augmented acoustic frames 304 closer to the adverse acoustics of other unlabeled audio samples 303. In combination, MTR and SpecAugment may inject noises into the labeled audio samples 303, tile random external noise sources along time and inserted before and overlapped onto the representation, and filtering the noise-injective unlabeled audio samples prior 303 to training the speech recognition model 200.

The audio encoder 210 of the augmented branch 320 receives the augmented sequence of acoustic frames 304A from the data augmentation module 360 and generates the higher order feature representation 326 for the corresponding augmented acoustic frame 304A. In particular, the strided convolutional layers 212 receive an augmented acoustic frame from the sequence of augmented acoustic frames 304A and generate an output 213. The transformer layers 214 receive the output 213 from the strided convolutional layers 212 and generate the higher order feature representation (i.e., augmented encoder output) 326 for the corresponding augmented acoustic frame 304A. Subsequently, a predication transformer network 328 receives the higher order feature representation 326 and generates a prediction 329 of the target branch output 316 generated by the target branch 310 at the corresponding time step. That is, the prediction transformer 328 may use contrastive loss 330 to learn to generate the prediction 329 as output from the augmented branch 320 that matches the target branch output 316 at each corresponding time step.

The unsupervised part 302 determines an unsupervised loss term 330 based on the target branch output 316 generated by the target branch 310 and the prediction 329 of the target branch output 316 generated by the augmented branch 320. In some examples, the unsupervised loss term 330 includes a contrastive loss term represented by:

$$L_{cont} = \sum_{t \in M} -\log \frac{\exp sim(h_t, c_t)/\tau}{\sum_{k \in K} \exp sim(h_t, c_k)/\tau} \quad (1)$$

In Equation 1, M includes a set of masked frame indices, K includes a set of distractor indices, $h_t$ is an encoder output, and $c_t$ is a convolutional neural network output. In other examples, the supervised loss term includes a reconstruction loss term L1 or cosine distance loss term. The unsupervised part 302 updates parameters of the audio encoder 210 based on the unsupervised loss term 330 determined at each of the plurality of time steps. Notably, using the audio frames 304 the target branch 310 generates an expected representation (i.e., target branch output 316) based on the current state of the audio encoder 210 and the augmented branch 320 aims to match the expectation representation using the augmented audio frames 304A.

Figure 4:
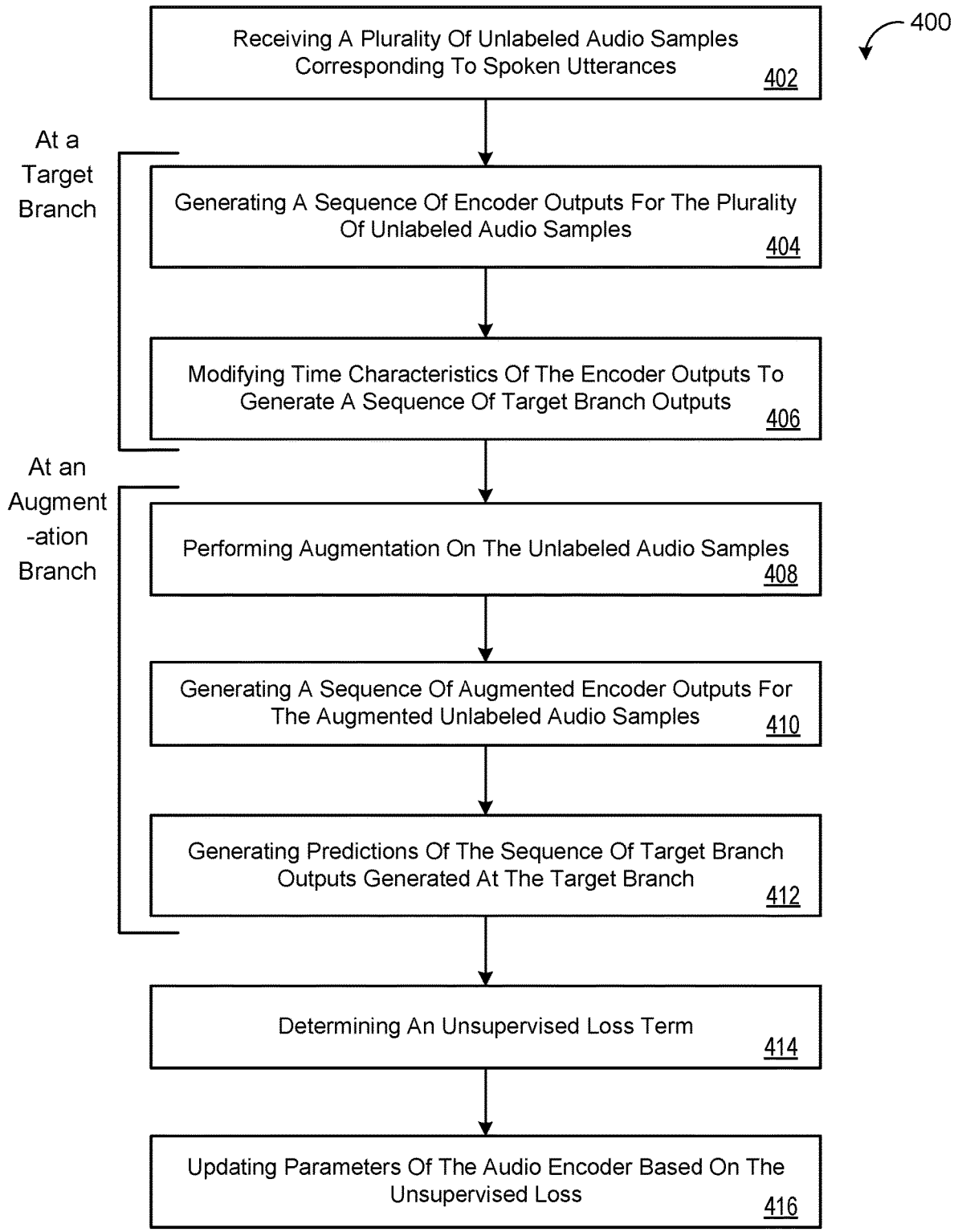
FIG. 4 is a flowchart of an example arrangement of operations for a method of training a speech recognition model using a contrastive Siamese network.

FIG. 4 is a flowchart of an exemplary arrangement of operations for a computer-implemented method 400 of training a speech recognition model using a contrastive Siamese network. At operation 402, the method 400 includes receiving a plurality of unlabeled audio samples 303 corresponding to spoken utterances 106 not paired with any corresponding transcriptions (i.e., labels 308). A target branch 310 of the contrastive Siamese network 300 performs operations 404 and 406. At operation 404, the method 400 includes generating a sequence of encoder outputs 312 for the plurality of unlabeled audio samples 303 using an audio encoder 210 of a speech recognition model 200. At operation 406, the method 400 includes modifying time characteristics of the encoder outputs 312 using the stop gradient operation 314 to generate a sequence of target branch outputs 316.

An augmentation branch 320, of the contrastive Siamese network 300 performs operations 408-412. At operation 408, the method 400 includes performing augmentation on the unlabeled audio samples 303 using an augmentation module 360. At operation 410, the method 400 includes generating a sequence of augmented encoder outputs 326 for the augmented unlabeled audio samples 304A using the audio encoder 210 of the speech recognition model 200. At operation 412, the method includes generating predictions 329 of the sequence of target branch output 316 generated at the target branch 310.

At operation 414, the method includes determining an unsupervised loss term 330 based on the target branch outputs 316 generated at the target branch 310 and the predictions 329 of the sequence of target branch outputs 316 generated at the augmentation branch 320. At operation 416, the method 400 includes updating parameters of the audio encoder 210 based on the unsupervised loss 330.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
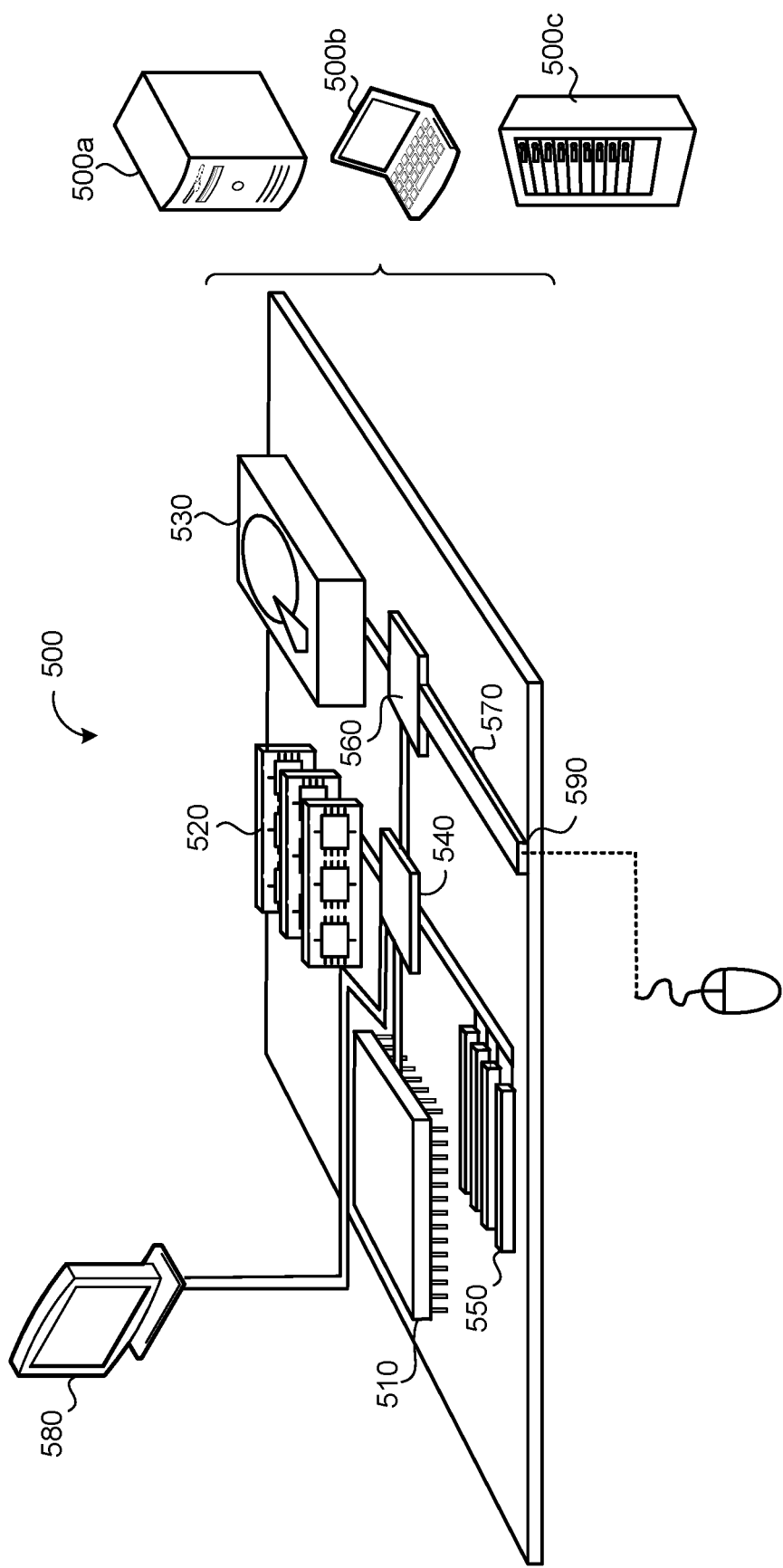
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A contrastive Siamese network for training a speech recognition model, the contrastive Siamese network comprising an unsupervised subnetwork trained on a plurality of unlabeled audio samples corresponding to spoken utterances not paired with corresponding transcriptions, the unsupervised subnetwork comprising:
a target branch configured to:
receive, as input to an audio encoder of the speech recognition model, a sequence of acoustic frames extracted from the unlabeled audio samples; and
at each of a plurality of time steps, generate a target branch output for a corresponding acoustic frame in the sequence of acoustic frames input to the audio encoder at the corresponding time step; and
an augmented branch configured to:
perform augmentation on the sequence of acoustic frames extracted from the unlabeled audio samples to generate a sequence of augmented acoustic frames;
at each of the plurality of time steps, generate, as output from the audio encoder, a higher order feature representation for a corresponding augmented acoustic frame in the sequence of augmented acoustic frames; and
at each of the plurality of time steps, generate, using the higher order feature representation output from the audio encoder at the corresponding time step, a prediction of the target branch output generated by the target branch at the corresponding time step,
wherein the unsupervised subnetwork is configured to:
at each of the plurality of time steps, determine an unsupervised loss term based on the target branch output generated by the target branch at the corresponding time step and the prediction of the target branch output generated by the augmented branch at the corresponding time step; and update parameters of the audio encoder based on the unsupervised loss term determined at each of the plurality of time steps.

2. The contrastive Siamese network of claim 1, wherein the unsupervised loss term comprises a contrastive loss term.

3. The contrastive Siamese network of claim 1, wherein the augmentation performed on the sequence of acoustic frames comprises time modification and masking.

4. The contrastive Siamese network of claim 1, wherein the target branch is further configured to:
at each of a plurality of time steps, generate, as output from the audio encoder, a higher order feature representation for the corresponding acoustic frame in the sequence of acoustic frames input to the audio encoder at the corresponding time step,
wherein the target branch is configured to generate the target branch output for the corresponding acoustic frame by modifying time characteristics of the higher order feature representation.

5. The contrastive Siamese network of claim 4, wherein modifying the time characteristics of the higher order feature representation comprises modifying, at each of the plurality of time steps, the time characteristics of the higher order feature representation generated as output from the audio encoder for the corresponding acoustic frame to match time characteristics associated with the higher order feature representation generated as output from the audio encoder for the corresponding augmented acoustic frame at the corresponding time step.

6. The contrastive Siamese network of claim 1, wherein the augmented branch comprises a prediction network of transformer layers configured to, at each of the plurality of time steps:
receive, as input, the higher order feature representation output from the audio encoder at the corresponding time step; and
generate, as output, the prediction of the target branch output generated by the target branch at the corresponding time step.

7. The contrastive Siamese network of claim 1, further comprising a supervised subnetwork trained on a plurality of labeled audio samples corresponding to spoken utterances paired with corresponding transcriptions, the supervised subnetwork configured to:
at each of a plurality of output steps for each labeled audio sample:
generate, using the speech recognition model, a corresponding speech recognition result for the labeled audio sample; and
determine a supervised loss term based on the corresponding speech recognition result for the labeled audio sample and the corresponding transcription of the labeled audio sample; and
update parameters of the speech recognition model based on the supervised loss term determined at each of the plurality of output steps for each labeled audio sample in the plurality of labeled audio samples.

8. The contrastive Siamese network of claim 7, wherein the corresponding speech recognition result generated for the labeled audio sample using the speech recognition model comprises a probability distribution over possible speech recognition hypotheses for the labeled audio sample at the corresponding output step.

9. The contrastive Siamese network of claim 7, wherein the supervised subnetwork is configured to update the parameters of the speech recognition model based on the supervised loss term independently of the unsupervised network updating the parameters of the audio encoder of the speech recognition model.

10. The contrastive Siamese network of claim 7, wherein the supervised subnetwork is further configured to apply data augmentation to at least one of the labeled audio samples in the plurality of labeled audio samples input to the speech recognition model.

11. The contrastive Siamese network of claim 10, wherein the applied data augmentation comprises at least one of adding noise, adding reverberation, or manipulating timing.

12. The contrastive Siamese network of claim 1, wherein the trained speech recognition model comprises a Transformer-Transducer (T-T) model, the T-T model comprising:
the audio encoder configured to:
receive, as input, a sequence of acoustic frames extracted from audio data characterizing a spoken utterance; and
generate, at each of a plurality of time steps, a higher order feature representation for a corresponding acoustic frame in the sequence of acoustic frames;
a label encoder configured to:
receive, as input, a sequence of non-blank symbols output by a final softmax layer; and
generate, at each of the plurality of time steps, a dense representation; and
a joint network configured to:
receive, as input, the higher order feature representation generated by the audio encoder at each of the plurality of time steps and the dense representation generated by the label encoder at each of the plurality of time steps; and
generate, at each of the plurality of time steps, a probability distribution over possible speech recognition hypothesis at the corresponding time step,
wherein the audio encoder comprises a neural network having a stack of strided convolutional layers and transformer layers.

13. A computer-implemented method when executed on data processing hardware causes the data processing hardware to perform operations comprising:
receiving a plurality of unlabeled audio samples corresponding to spoken utterances not paired with corresponding transcriptions;
at a target branch of a contrastive Siamese network:
generating, using an audio encoder of a speech recognition model, a sequence of encoder outputs for the plurality of unlabeled audio samples; and
modifying time characteristics of the encoder outputs to generate a sequence of target branch outputs;
at an augmentation branch of the contrastive Siamese network:
performing augmentation on the unlabeled audio samples;
generating, using the audio encoder of the speech recognition model, a sequence of augmented encoder outputs for the augmented unlabeled audio samples; and
generating, using a prediction network configured to receive the sequence of augmented encoder outputs, predictions of the sequence of target branch outputs generated at the target branch;
determining an unsupervised loss term based on the target branch outputs generated at the target branch and the predictions of the sequence of target branch outputs generated at the augmentation branch; and updating parameters of the audio encoder based on the unsupervised loss.

14. The computer-implemented method of claim 13, wherein the unsupervised loss term comprises a contrastive loss term.

15. The computer-implemented method of claim 13, wherein performing augmentation on the unlabeled audio samples comprises performing time modification and masking on the unlabeled audio samples.

16. The computer-implemented method of claim 13, wherein the operations further comprise generating, as output from the audio encoder, a higher order feature representation for the plurality of unlabeled audio samples.

17. The computer-implemented method of claim 16, wherein modifying the time characteristics of the encoder outputs to generate the sequence of target branch outputs comprises modifying the time characteristics of the encoder outputs generated as output from the audio encoder to match time characteristics associated with the sequence of augmented encoder outputs from the audio encoder.

18. The computer-implemented method of claim 13, wherein the operations further comprise:
receiving, as input to a prediction network of transformer layers of the augmented branch, the sequence of augmented encoder outputs; and
generate, as output from the prediction network of transformer layers of the augmented branch, the predictions of the sequence of target branch outputs generated at the target branch.

19. The computer-implemented method of claim 13, wherein the operations further comprise:
receiving a plurality of labeled audio samples corresponding to spoken utterances paired with corresponding transcriptions;
generating, using the speech recognition model, speech recognition results for the labeled audio samples;
determining a supervised loss term based on the speech results for the labeled audio samples and the corresponding transcriptions of the labeled audio samples; and
updating parameters of the speech recognition model based on the supervised loss term.

20. The computer-implemented method of claim 19, wherein the speech recognition results generated for the labeled audio samples using the speech recognition model comprises a probability distribution over possible speech recognition hypotheses for the labeled audio sample at the corresponding output step.

21. The computer-implemented method of claim 19, wherein the operations further comprise updating parameters of the speech recognition model based on the supervised loss term independently of updating parameters of the audio encoder based on the unsupervised loss term.

22. The computer-implemented method of claim 19, wherein the operations further comprise applying data augmentation to at least one of the labeled audio samples.

23. The computer-implemented method of claim 22, wherein applying data augmentations comprises at least one of adding noise, adding reverberation, or manipulating timing.

24. The computer-implemented method of claim 13, wherein the speech recognition model comprises a Transformer-Transducer (T-T) model and the operations further comprise:
receiving, as input to the audio encoder of the T-T model, a plurality of unlabeled audio samples corresponding to spoken utterances not paired with corresponding transcriptions;
generating, by the audio encoder, at each of a plurality of time steps, a sequence of acoustic frames extracted from audio data characterizing a spoken utterance;
receiving, as input to a label encoder of the T-T model, a sequence of non-blank symbols output by a final softmax layer;
generating, by the label encoder, at each of the plurality of time steps, a dense representation;
receiving, as input to a joint network of the T-T model, the higher order feature representation generated by the audio encoder at each of the plurality of time steps and the dense representation generated by the label encoder at each of the plurality of time steps; and
generating, by the joint network, at each of the plurality of time steps, a probability distribution over possible speech recognition hypothesis at the corresponding time step,
wherein the audio encoder comprises a neural network having a stack of strided convolutional layers and transformer layers.

* * * * *